US011449703B2

(12) United States Patent
Hanayama et al.

(10) Patent No.: US 11,449,703 B2
(45) Date of Patent: Sep. 20, 2022

(54) ELECTRONIC APPARATUS, AND NON-TRANSITORY COMPUTER READABLE RECORDING MEDIUM THAT STORES IMAGE DETERMINATION PROGRAM

(71) Applicant: KYOCERA DOCUMENT SOLUTIONS INC., Osaka (JP)

(72) Inventors: Tatsuya Hanayama, Osaka (JP); Daijiro Kitamoto, Osaka (JP); Kentaro Okamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 13 days.

(21) Appl. No.: 16/838,867

(22) Filed: Apr. 2, 2020

(65) Prior Publication Data
US 2020/0327362 A1 Oct. 15, 2020

(30) Foreign Application Priority Data
Apr. 12, 2019 (JP) .............................. JP2019-076006

(51) Int. Cl.
*G06K 9/62* (2022.01)
(52) U.S. Cl.
CPC ................................ *G06K 9/6215* (2013.01)
(58) Field of Classification Search
CPC .. G06K 9/6215; G06K 9/6211; G06K 9/6212; G06K 2009/6213; G06K 9/6214; G06K 9/6217; G06K 9/00758; G06K 9/64; G06K 9/645; G06K 9/00268; G06K 9/00281; G06K 9/00288; G06K 9/00302; G06K 9/00308; G06K 9/00328

USPC ......... 382/224–228, 209–210, 214, 115–118
See application file for complete search history.

(56) References Cited

U.S. PATENT DOCUMENTS

| | | | | |
|---|---|---|---|---|
| 2008/0068641 | A1* | 3/2008 | Dance | G06F 3/1239 358/1.15 |
| 2012/0250950 | A1* | 10/2012 | Papakipos | G06K 9/00288 382/118 |
| 2015/0033362 | A1* | 1/2015 | Mau | G06K 9/00288 726/27 |
| 2017/0140212 | A1* | 5/2017 | Lo | G06K 9/6206 |

(Continued)

FOREIGN PATENT DOCUMENTS

JP 2013205847 A 10/2013

*Primary Examiner* — Claire X Wang
*Assistant Examiner* — Stephen M Brinich
(74) *Attorney, Agent, or Firm* — Li & Cai Intellectual Property (USA) Office

(57) ABSTRACT

An electronic apparatus includes a controller circuit being configured to detect a first input information, the first input information being information input in an input device by a user, create a first image and display the first image on a display device, the first image being an image created based on the first input information, obtain the first input information and the first image, detect, from the storage device, second input information being same as the first input information, determine a similarity degree between the first image created based on the first input information and a second image in association with the second input information detected from the storage device, and where the similarity degree between the first image and the second image is smaller than a threshold, output a result that the similarity degree is smaller than the threshold.

3 Claims, 4 Drawing Sheets

(56) References Cited

U.S. PATENT DOCUMENTS

2018/0107865 A1* 4/2018 Ahlawat ............. G06F 16/5838
2020/0082062 A1* 3/2020 Mequanint ............. G06F 21/44
2021/0110164 A1* 4/2021 Mehta ................ G06K 9/00275

* cited by examiner

ELECTRONIC APPARATUS, AND NON-TRANSITORY COMPUTER READABLE RECORDING MEDIUM THAT STORES IMAGE DETERMINATION PROGRAM

CROSS-REFERENCE TO RELATED PATENT APPLICATION

This application claims the benefit of Japanese Priority Patent Application JP 2019-076006 filed Apr. 12, 2019, the entire contents of which are incorporated herein by reference.

FIELD OF THE DISCLOSURE

The present disclosure relates to an electronic apparatus configured to execute an image display program to display an image based on input information. The present disclosure further relates to a non-transitory computer readable recording medium that records an image determination program executable by the electronic apparatus.

BACKGROUND OF THE DISCLOSURE

There is known an electronic apparatus (for example, image forming apparatus) that executes an image display program to display an image based on input information.

SUMMARY OF THE DISCLOSURE

It is desirable for an electronic apparatus to display an image without any problem (i.e., image with layout unbroken).

According to an embodiment of the present disclosure, there is provided an electronic apparatus, including:
a controller circuit; and
a storage device,
the controller circuit being configured to, by executing an image display program,
  detect a first input information, the first input information being information input in an input device by a user, and
  create a first image and display the first image on a display device, the first image being an image created based on the first input information,
the storage device being configured to
  store multiple pairs of second input information and a second image in association with each other, the second input information being input information detected by previously executing the image display program by the controller circuit, the second image being an image created based on the second input information,
the controller circuit being configured to, by executing an image determination program,
  obtain the first input information and the first image,
  detect, from the storage device, second input information being same as the first input information,
  determine a similarity degree between the first image created based on the first input information and a second image in association with the second input information detected from the storage device, and
  where the similarity degree between the first image and the second image is smaller than a threshold, output a result that the similarity degree is smaller than the threshold.

According to an embodiment of the present disclosure, there is provided a non-transitory computer readable recording medium that stores an image determination program executable by an electronic apparatus including a controller circuit,
the controller circuit being configured to, by executing an image display program,
  detect a first input information, the first input information being information input in an input device by a user, and
  create a first image and display the first image on a display device, the first image being an image created based on the first input information,
the image determination program causing the controller circuit to obtain the first input information and the first image,
  detect, from a storage device, second input information being same as the first input information, the storage device being configured to store multiple pairs of second input information and a second image in association with each other, the second input information being input information detected by previously executing the image display program by the controller circuit, the second image being an image created based on the second input information,
  determine a similarity degree between the first image created based on the first input information and a second image in association with the second input information detected from the storage device, and
  where the similarity degree between the first image and the second image is smaller than a threshold, output a result that the similarity degree is smaller than the threshold.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. HARDWARE CONFIGURATION OF ELECTRONIC APPARATUS

Figure 1:
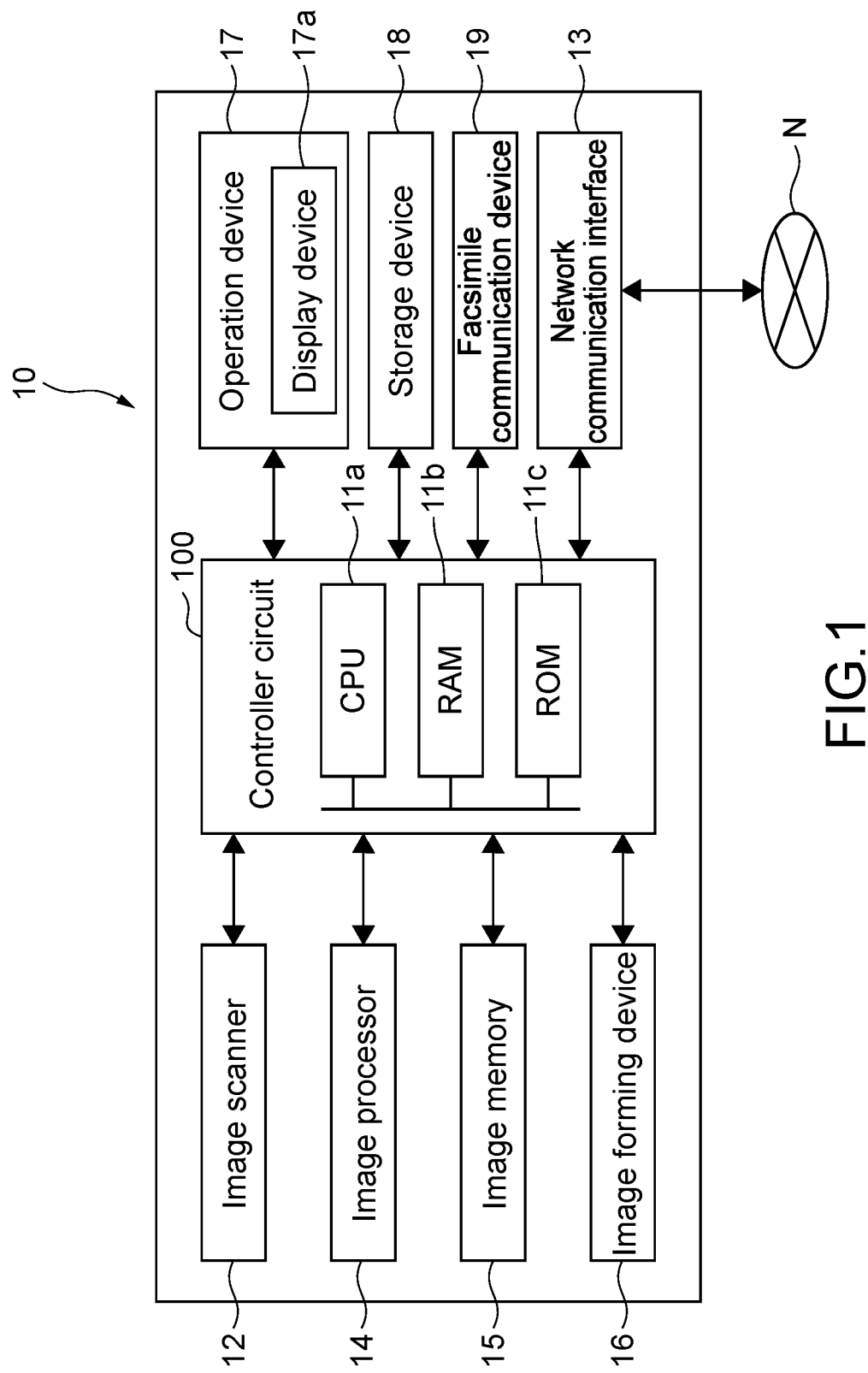
FIG. 1 shows a hardware configuration of an electronic apparatus according to an embodiment of the present disclosure.

FIG. 1 shows a hardware configuration of an electronic apparatus according to an embodiment of the present disclosure.

In the present embodiment, a hardware configuration of the electronic apparatus 10, i.e., an image forming apparatus (Multifunction Peripheral), will be described. The electronic apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the electronic apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

2. FUNCTIONAL CONFIGURATION OF ELECTRONIC APPARATUS

Figure 2:
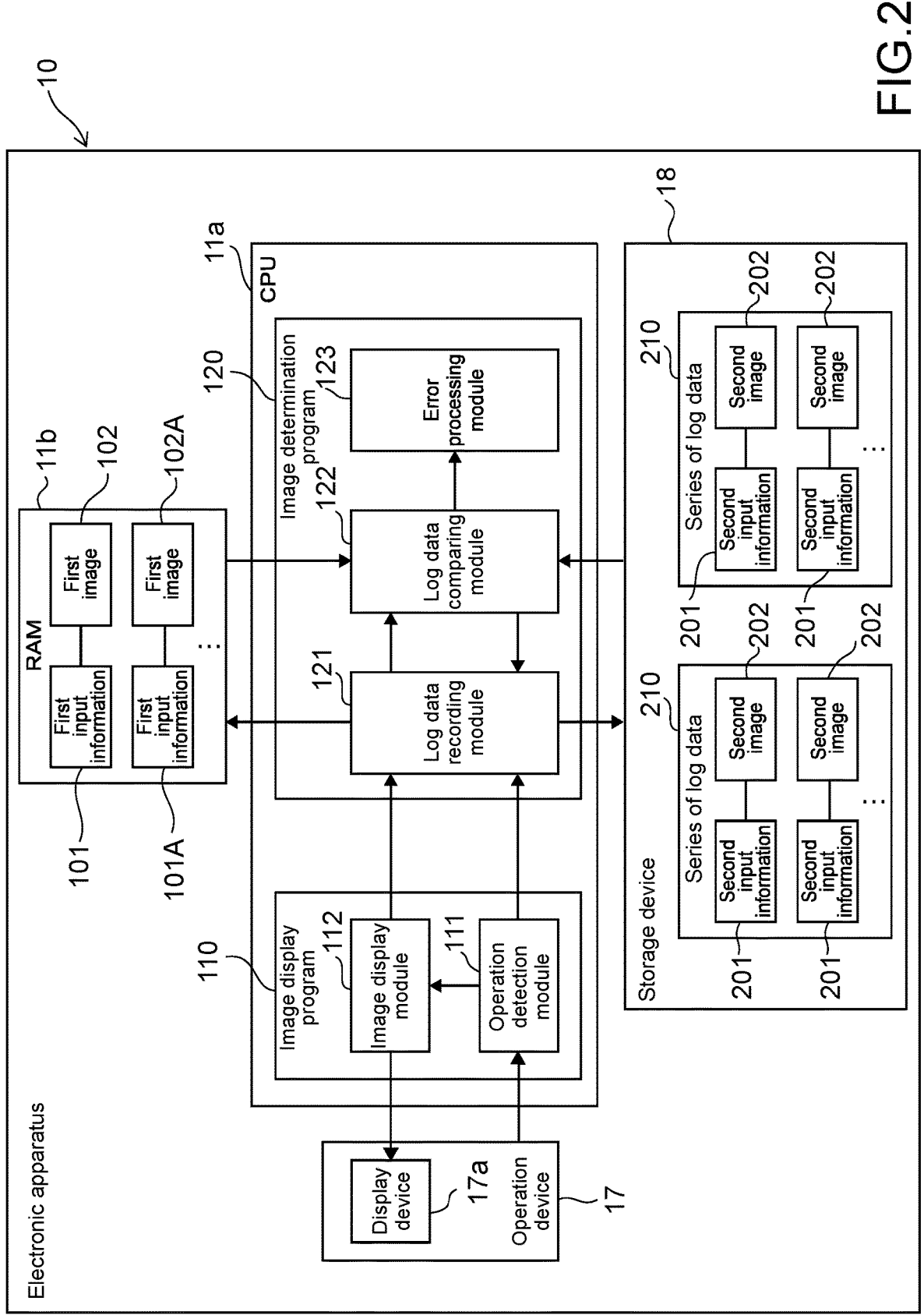
FIG. 2 shows a functional configuration of the electronic apparatus.

FIG. 2 shows a functional configuration of the electronic apparatus.

In the controller circuit 100 of the electronic apparatus 10, the CPU 11a loads an information processing programs (the image display program 110 and the image determination program 120) stored in the ROM 11c in the RAM 11b and executes the information processing programs.

The image display program 110 is, typically, a so-called extended application program. For example, the image display program 110 is supplied by a third vendor different from the vendor of the electronic apparatus 10, and downloaded after the electronic apparatus 10 is shipped as needed by an end user. However, the image display program 110 may be any information processing program for creating an image based on information input in the operation device 17 (input device) by a user and displaying the image on the display device 17a (display device).

In the controller circuit 100 of the electronic apparatus 10, the CPU 11a operates as, by executing the image display program 110, the operation detection module 111 and the image display module 112.

In the controller circuit 100 of the electronic apparatus 10, the CPU 11a operates as, by executing the image determination program 120, the log data recording module 121, the log data comparing module 122, and the error processing module 123.

The storage device 18 stores multiple pairs of the second input information 201 and the second image 202 in association with each other.

The second input information 201 is input information detected by previously executing the image display program 110 by the controller circuit 100. The input information is information, which is input in the operation device 17 (input device) by a user. In short, the second input information 201 is log data of previous operations.

The second image 202 is an image created based on the second input information 201 and displayed on the display device 17a (display device) by previously executing the image display program 110 by the controller circuit 100.

In short, the storage device 18 stores, in association with each other, multiple pairs of the second input information 201 input by a user and the second image 202 created based on the second input information 201 and displayed, by previously executing the image display program 110 by the controller circuit 100.

In some cases, by executing the image display program 110 by the controller circuit 100, a series of (continuous) multiple second input information 201 is input, and a series of (continuous) multiple second images 202 is created based on the series of (continuous) multiple second input information 201 and displayed. In this case, the storage device 18 stores, as a series of log data 210, a series of multiple pairs of the second input information 201 and the second image 202. In other words, the storage device 18 stores the multiple series of log data 210.

3. OPERATIONAL FLOW WHEN ELECTRONIC APPARATUS EXECUTES IMAGE DISPLAY PROGRAM

Figure 3:
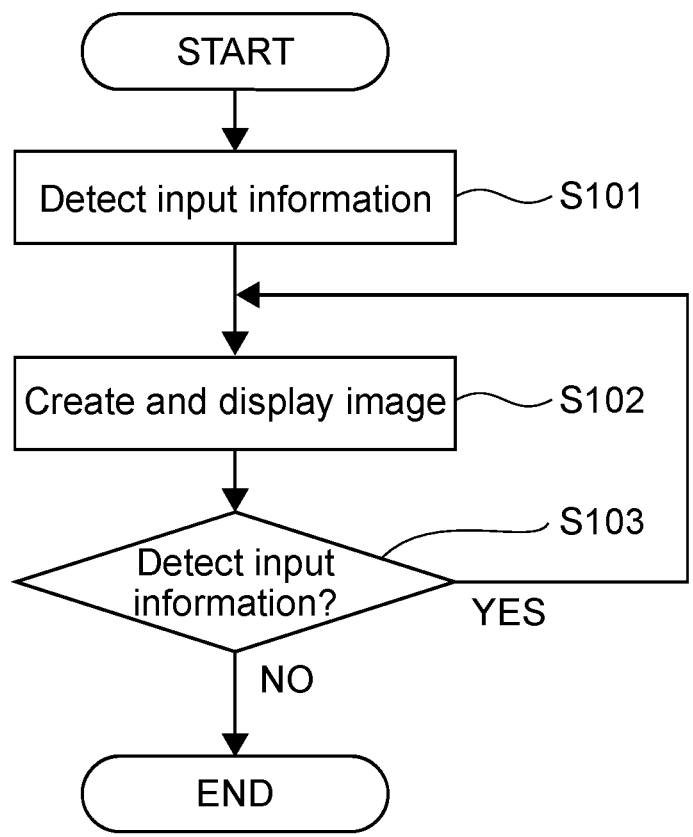
FIG. 3 shows an operational flow when the electronic apparatus executes the image display program.

FIG. 3 shows an operational flow when the electronic apparatus executes the image display program.

The operation detection module 111 detects information (first input information) input in the operation device 17 (input device) by a user. The operation detection module 111 supplies the detected first input information to the image display module 112 (Step S101).

The image display module 112 creates an image (first image) based on the first input information, and displays the first image on the display device 17a (display device) (Step S102).

Within a certain time period (before time-out), the operation detection module 111 detects a different first input information, which is input next to the first input information (Step S101). Then the operation detection module 111 supplies the detected different first input information to the image display module 112 (Step S103, YES). The image display module 112 creates a different first image based on the different first input information, and displays the different first image on the display device 17a (Step S102). By executing the image display program 110, the controller circuit 100 repeats detection of input information and creation and display of images until the time-out occurs (Step S103, NO).

4. OPERATIONAL FLOW WHEN ELECTRONIC APPARATUS EXECUTES IMAGE DETERMINATION PROGRAM

Figure 4:
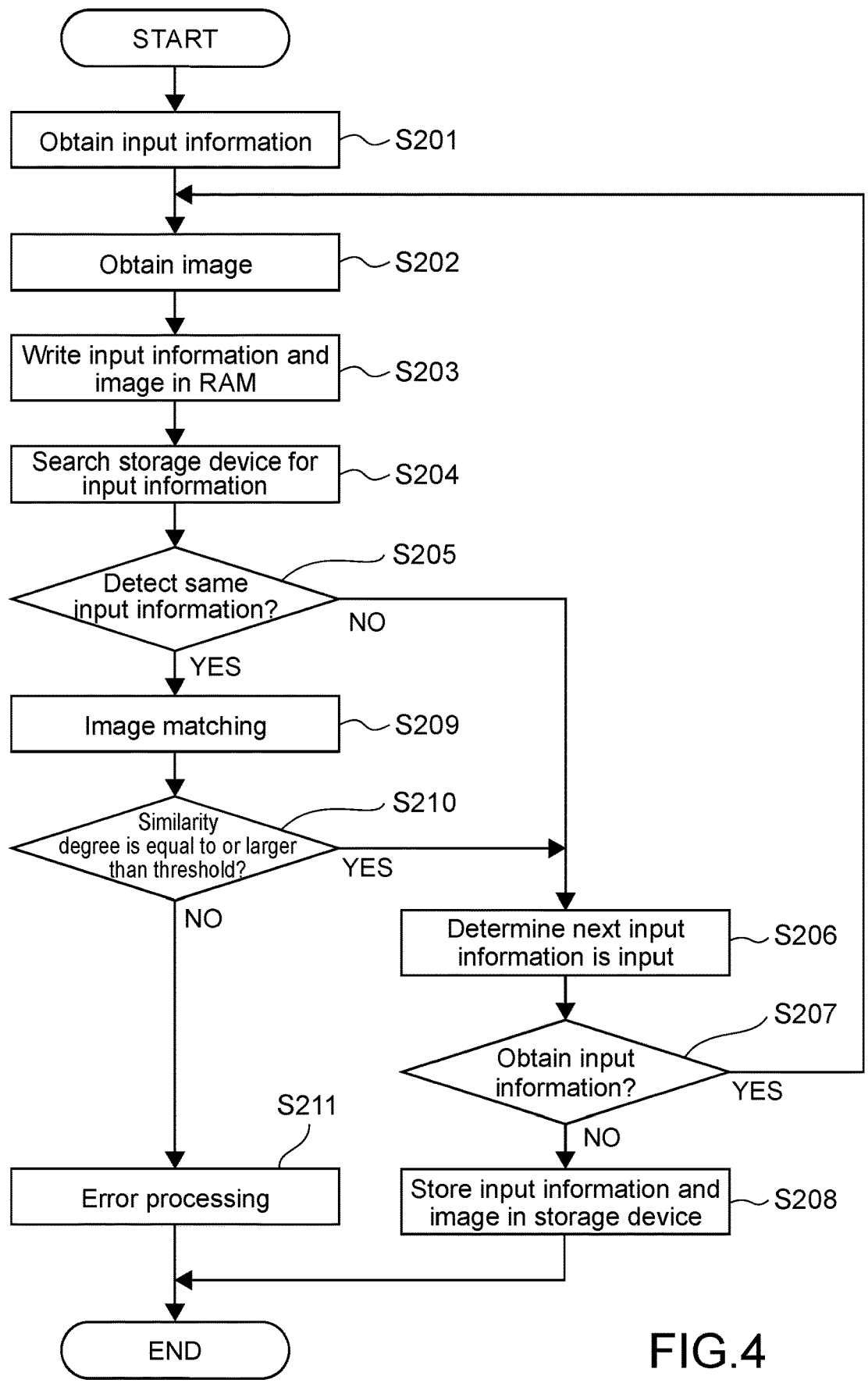
FIG. 4 shows an operational flow when the electronic apparatus executes the image determination program.

FIG. 4 shows an operational flow when the electronic apparatus executes the image determination program.

The log data recording module 121 obtains the first input information (Step S101) detected by the operation detection module 111 (Step S201). The log data recording module 121 obtains the first image (Step S102) created and displayed by the image display module 112 (Step S202). The log data recording module 121 writes the obtained first input information 101 and the obtained first image 102 in the RAM 11b in association with each other (Step S203).

The log data comparing module 122 detects (searches), from the storage device 18, the second input information 201 being same as the first input information 101 (Step S204). Hereinafter, (1) a case where the second input information 201 being same as the first input information 101 is not detected (Step S205, NO) and (2) a case where the second input information 201 being same as the first input information 101 is detected (Step S205, YES) will be described separately.

(1) Case where the Second Input Information 201 being Same as the First Input Information 101 is not Detected (Step S205, NO)

The log data comparing module 122 does not detect, from the storage device 18, the second input information 201 being same as the first input information 101 (Step S205, NO). In other words, the current first input information 101 is not stored in the storage device 18, and is input in the electronic apparatus 10 for the first time.

In this case, the log data recording module 121 determines whether or not there is different first input information (Step S206), which is input next to the first input information (Step S101). Where the log data recording module 121 does not obtain different first input information within a certain time period (time-out occurs) (Step S207, NO), the log data recording module 121 stores, in the storage device 18 in association with each other, the first input information 101 and the first image 102 (Step S203) written in the RAM 11b (Step S208). As a result, the pair of the first input information 101 input in the electronic apparatus 10 for the first time and the first image 102, which is created based on the first input information and displayed, is stored in the storage device 18 as log data.

Meanwhile, the log data recording module 121 obtains the different first input information 101A (Step S207, YES), which is input next to the first input information 101 (Step S101). The log data recording module 121 obtains the different first image 102A created based on the different first input information 101A (Step S202). The log data recording module 121 writes the obtained different first input information 101A and the different first image 102A in the RAM 11b in association with each other (Step S203).

Previously, the log data comparing module 122 did not detect the second input information 201 being same as the first input information 101 (Step S205, NO). So the log data comparing module 122 will not detect the second input information 201 being same as the different first input information 101A, which is input next to the first input information 101 (Step S205, NO). In other words, the log data comparing module 122 detects the series of log data 210, which includes the continuous first input information 101 and 101A in this order. In other words, if the first input information 101 is different from the second input information 201 included in the series of log data 210 even once, then the log data comparing module 122 will not detect the same second input information 201 at all after that (Step S205, NO)

In this case, the log data recording module 121 stores the series of first input information 101 and 101A and the series of first images 102 and 102A (Step S203), which are written in the RAM 11b until the time-out occurs (Step S207, NO), in the storage device 18 in association with each other (Step S208). As a result, the pairs of the series of first input information 101 and 101A, which is input in the electronic apparatus 10 for the first time, and the series of first images 102 and 102A, which is created based on the series of first input information 101 and 101A and displayed, are stored in the storage device 18 as the series of log data 210.

(2) Case where the Second Input Information 201 being Same as the First Input Information 101 is Detected (Step S205, YES)

The log data comparing module 122 detects, from the storage device 18, the second input information 201 being same as the first input information 101 (Step S205, YES). In other words, the current first input information 101 is stored in the storage device 18, and is input information previously input in the electronic apparatus 10.

In this case, the log data comparing module 122 reads, from the storage device 18, the second image 202 in association with the detected second input information 201 (Step S205, YES). The log data comparing module 122 determines whether or not the first image 102 created based on the first input information 101 matches with the read second image 202. Specifically, the log data comparing module 122 determines whether or not the similarity degree between the first image 102 and the second image 202 is equal to or larger than the threshold (Step S209). The similarity degree is a value indicating a coincidence amount in the images. The threshold is, for example, an acceptable (i.e., difficult to say that there is problem) maximum value even if an image is different from an image to be actually displayed based on the image display program 110. Examples of the acceptable maximum value include a maximum value without any problem affecting readability of texts, a maximum value without any problem affecting operability of a GUI to be operated as a button, and the like. The threshold may be, specifically, about 50 to 80%.

The log data comparing module 122 determines that the similarity degree between the first image 102 and the second image 202 is smaller than the threshold (Step S210, NO). The case where the similarity degree is smaller than the threshold means that, even if the first image 102 and the second image 202 are created based on the common input information (the first input information 101 and the second input information 201) and displayed, the difference between the first image 102 and the second image 202 is large. This status means that at least one of the first image 102 and the second image 202 is not an expected image (problem status with unacceptable difference from expected image, which is to be actually displayed based on the image display program 110).

Where the similarity degree between the first image 102 and the second image 202 is smaller than the threshold (Step S210, NO), the error processing module 123 immediately executes error processing (Step S211) irrespective of whether or not there is input information to be input next (Step S207). For example, the error processing module 123 outputs a result indicating that the similarity degree between the first image 102 and the second image 202 is smaller than the threshold. Specifically, the error processing module 123 may notify a personal computer (not shown), which is used by a creator of the vendor of the electronic apparatus 10, of the result. As a result, the creator of the vendor of the electronic apparatus 10 may correct the problem (so-called broken layout) of the image, which occurs when the electronic apparatus 10 executes the image display program 110.

Meanwhile, the log data comparing module 122 determines that the similarity degree between the first image 102 and the second image 202 is equal to or larger than the threshold (Step S210, YES). The case where the similarity degree is equal to or larger than the threshold means that there is no difference or a small difference between the first image 102 and the second image 202 created based on the common input information (the first input information 101 and the second input information 201) and displayed. This status means that both the first image 102 and the second image 202 are highly likely to be expected (i.e., difficult to say that there is problem) images.

In this case, if the log data recording module 121 does not obtain the different first input information (Step S207, NO), which is input next to the first input information (Step S101), the log data recording module 121 stores the first input information 101 and the first image 102 written in the RAM 11b (Step S203) in the storage device 18 in association with each other (Step S208). As a result, the pair of the first input information 101 and the first image 102, which is created based on the first input information and displayed, is stored in the storage device 18 as log data. The first image 102 is highly likely to be an expected (i.e., difficult to say that there is problem) image. By storing and machine-learning the first image 102, which is highly likely to be an expected image, accuracy of matching executed by the log data comparing module 122 may be increased in the future.

Meanwhile, the log data comparing module 122 determines that the similarity degree between the first image 102, which is created based on the first input information 101 and displayed, and the second image 202 is equal to or larger than the threshold (Step S210, YES), and then does not detect the second input information 201 being same as the different first input information 101A, which is input next to the first input information 101 (Step S205, NO). In this case, the log data recording module 121 stores the different first input information 101A and the different first image 102A, which is created based on the different first input information 101A and displayed, in the storage device 18 in association with each other (Step S208). As a result, the pair of the different first input information 101A, which is input in the electronic apparatus 10 for the first time, and the different first image 102A, which is created based on the different first input information 101A and displayed, is stored in the storage device 18 as log data.

5. MODIFICATION EXAMPLE

In the present embodiment, the electronic apparatus 10 executes the image display program 110 and the image determination program 120, and stores the series of log data 210 in the local storage device 18. Alternatively, two communicably connected electronic apparatuses may execute the image display program 110 and the image determination program 120, respectively. A storage device communicably connected to the electronic apparatus that executes the image determination program 120 may store the series of log data 210.

6. CONCLUSION

When an electronic apparatus executes an image display program to display an image, the displayed image may have an unacceptable difference from the expected image, which is to be actually displayed (so-called broken layout). Examples of reasons include a case where the electronic apparatus may receive incomplete data from a server apparatus because of a bad network environment, a case where multiple application programs installed in the electronic apparatus affect each other, and the like.

Such an image display program may be, for example, an extended application program. An extended application program is, for example, supplied by a third vendor different from the vendor of the electronic apparatus, and downloaded after the electronic apparatus is shipped as needed by an end user.

Such a broken layout is highly likely to occur in such an extended application program (image display program) downloaded as needed by an end user. However, in a software creating stage for an electronic apparatus before the electronic apparatus is shipped, it is difficult to define, as an error, a broken layout which may occur in an extended application program (image display program) to be downloaded in the future. Since it is difficult to define such a broken layout as an error, as a result, it is also difficult to create software configured to detect a broken layout.

(1) In view of the aforementioned circumstances, according to the present embodiment, the electronic apparatus 10 is configured to detect, from the storage device 18, the second input information 201 being same as the first input information 101 (Step S205, YES), determine a similarity degree between the first image 102 created based on the first input information 101 and a second image 202 in association with the second input information 201 detected from the storage device 18, and where the similarity degree between the first image 102 and the second image 202 is smaller than a threshold (Step S210, NO), output a result that the similarity degree is smaller than the threshold (Step S211). As a result, the electronic apparatus 10 determines that the similarity degree between the first image 102 and the second image 202 is smaller than the threshold. As a result, the electronic apparatus 10 determines the case where the similarity degree is smaller than the threshold. This status means that, even if the first image 102 and the second image 202 are created based on the common input information (the first input information 101 and the second input information 201) and displayed, the difference between the first image 102 and the second image 202 is large. In other words, the electronic apparatus 10 may determine that at least one of the first image 102 and the second image 202 is not an expected image (problem status with unacceptable difference from expected image, which is to be actually displayed based on the image display program 110). As a result, the creator of the vendor of the electronic apparatus 10 may correct the problem (so-called broken layout) of the image, which occurs when the electronic apparatus 10 executes the image display program 110.

(2) According to the present embodiment, the electronic apparatus 10 is configured to detect, from the storage device 18, the second input information 201 being same as the first input information 101 (Step S205, YES), and where the similarity degree between the first image 102 and the second image 202 is equal to or larger than the threshold (Step S210, YES), store the first input information 101 and the first image 102 in the storage device 18 in association with each other (Step S208). As a result, the electronic apparatus 10 determines that the similarity degree between the first image 102 and the second image 202 is equal to or larger than the threshold. As a result, the electronic apparatus 10 determines the case where the similarity degree is equal to or larger than the threshold. This status means that there is no difference or a small difference between the first image 102 and the second image 202 created based on the common input information (the first input information 101 and the second input information 201) and displayed. In other words, the electronic apparatus 10 may determine that both the first image 102 and the second image 202 are highly likely to be expected images. According to the present embodiment, by storing and machine-learning the first image 102, which is highly likely to be an expected image, accuracy of matching executed by the log data comparing module 122 may be increased in the future.

(3) According to the present embodiment, the electronic apparatus 10 is configured to, where second input information 201 being same as the first input information 101 is not detected from the storage device 18 (Step S205, NO), store the first input information 101 and the first image 102 in the storage device 18 in association with each other (Step S208). As a result, the pair of the first input information 101 input in the electronic apparatus 10 for the first time and the first image 102, which is created based on the first input information and displayed, is stored in the storage device 18 as log data.

(4) According to the present embodiment, the electronic apparatus 10 is configured to detect, from the storage device 18, the second input information 201 being same as the first input information 101 (Step S205, YES), and where the similarity degree between the first image 102 and the second image 202 is equal to or larger than the threshold (Step S210, YES), and where second input information 201 being same as different first input information 101 is not detected from the storage device 18, the different first input information being input next to the first input information 101 (Step S205, NO), store the different first input information 101 and a different first image 102 in the storage device 18 in association with each other, the different first image 102 being an image created based on the different first input information 101 (Step S208). As a result, the pair of the different first input information 101A, which is input in the electronic apparatus 10 for the first time, and the different first image 102A, which is created based on the different first input information 101A and displayed, is stored in the storage device 18 as log data.

(5) According to the present embodiment, the image display program 110 is an extended application program. In a software creating stage for an electronic apparatus before the electronic apparatus is shipped, it is difficult to define, as an error, a broken layout which may occur in an extended application program (image display program) to be downloaded in the future. To the contrary, according to the present embodiment, the similarity degree between images created based on the common input information is determined. As a result, it is possible to determine a broken layout, which is not defined as an error yet. As a result, error processing may be made faster, the quality of the electronic apparatus 10 may be increased, and problems may be examined effectively.

It should be understood by those skilled in the art that various modifications, combinations, sub-combinations and alterations may occur depending on design requirements and other factors insofar as they are within the scope of the appended claims or the equivalents thereof

What is claimed is:

1. An electronic apparatus, comprising:
a controller circuit; and
a storage device,
the controller circuit being configured to, by executing an image display program,
  detect a first input information, the first input information being information input in an input device by a user, and
  create a first image and display the first image on a display device, the first image being an image created based on the first input information,
the storage device being configured to
  store multiple pairs of second input information and a second image in association with each other, the second input information being input information detected by previously executing the image display program by the controller circuit, the second image being an image created based on the second input information,
the controller circuit being configured to, by executing an image determination program,
  obtain the first input information and the first image,
  detect, from the storage device, second input information being same as the first input information,
  determine a similarity degree between the first image created based on the first input information and a second image in association with the second input information detected from the storage device,
  where the similarity degree between the first image and the second image is smaller than a threshold, output a result that the similarity degree is smaller than the threshold, and
  where the similarity degree between the first image and the second image is equal to or larger than the threshold, store the first input information and the first image in the storage device in association with each other, and
  where the similarity degree between the first image and the second image is equal to or larger than the threshold, and
  where second input information being same as different first input information is not detected from the storage device, the different first input information being input next to the first input information,
  store the different first input information and a different first image in the storage device in association with each other, the different first image being an image created based on the different first input information.

2. The electronic apparatus according to claim 1, wherein the image display program is an extended application program.

3. An electronic apparatus, comprising:
a controller circuit; and
a storage device,
the controller circuit being configured to, by executing an image display program,
  detect a first input information, the first input information being information input in an input device by a user, and
  create a first image and display the first image on a display device, the first image being an image created based on the first input information,
the storage device being configured to
  store multiple pairs of second input information and a second image in association with each other, the second input information being input information detected by previously executing the image display program by the controller circuit, the second image being an image created based on the second input information,
the controller circuit being configured to, by executing an image determination program,
  obtain the first input information and the first image,
  detect, from the storage device, second input information being same as the first input information,
  determine a similarity degree between the first image created based on the first input information and a second image in association with the second input information detected from the storage device, and
  where second input information being same as the first input information is not detected from the storage device, store the first input information and the first image in the storage device in association with each other.

* * * * *